United States Patent
Weiss et al.

(10) Patent No.: US 10,782,221 B2
(45) Date of Patent: Sep. 22, 2020

(54) SYSTEM AND METHOD FOR DETERMINING A PARTICLE CONTAMINATION

(71) Applicants: Robert Bosch GmbH, Stuttgart (DE); TRUMPF Photonic Components GmbH, Ulm (DE)

(72) Inventors: Stefan Weiss, Tübingen (DE); Alexander Herrmann, Reutlingen (DE); Robert Wolf, Dresden (DE); Alexander Van Der Lee, Venlo (NL); Wolfram Johannes Martin Lyda, Mössingen (DE); Balazs Jatekos, Budapest (HU); Robert Weiss, Waldbronn (DE); Sören Sofke, Tübingen (DE); Hans Spruit, Waalre (NL); Jens-Alrik Adrian, Pfullingen (DE); Matthias Falk, Leinfelden-Echterdingen (DE); Dominik Moser, Neu-Ulm (DE)

(73) Assignees: ROBERT BOSCH GMBH, Stuttgart (DE); TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 16/658,532

(22) Filed: Oct. 21, 2019

(65) Prior Publication Data
US 2020/0132582 A1    Apr. 30, 2020

(30) Foreign Application Priority Data
Oct. 26, 2018    (DE) .................. 10 2018 218 378

(51) Int. Cl.
*G01N 21/00* (2006.01)
*G01N 15/06* (2006.01)
*G01N 15/14* (2006.01)

(52) U.S. Cl.
CPC ........ *G01N 15/06* (2013.01); *G01N 15/1429* (2013.01); *G01N 2015/0693* (2013.01)

(58) Field of Classification Search
CPC .............. G01N 21/53; G01N 15/0205; G01N 15/1459; G01N 21/51; G01N 15/1434
(Continued)

(56) References Cited

U.S. PATENT DOCUMENTS

2010/0253943 A1* 10/2010 Fu ..................... G01N 15/0205
356/335
2013/0174643 A1* 7/2013 Wang ................. G01N 15/0272
73/28.04

* cited by examiner

*Primary Examiner* — Md M Rahman
(74) *Attorney, Agent, or Firm* — Maginot, Moore & Beck, LLP

(57) ABSTRACT

A system for determining a particle contamination and a method for determining a particle contamination in a measurement environment is provided in which individual particles in the measurement environment are detected (S1), wherein a) an estimate of the number of particles per volume in the measurement environment is ascertained (S2), b) an estimate of the number of particles per volume and characterization information describing the particle source in the measurement information are taken as a basis for ascertaining an output value for the particle contamination in the measurement environment (S3), and c) context-related data are made available and the characterization information is estimated on the basis of the available context-related data (S4). The estimation of the characterization information on the basis of the available context-related data avoids the conventional restriction of the evaluable characterization information to firmly prescribed information and instead provides flexible adaptation of the characterization information to be evaluated to the context-related data.

15 Claims, 1 Drawing Sheet

(58) Field of Classification Search
USPC .......................................................... 356/338
See application file for complete search history.

SYSTEM AND METHOD FOR DETERMINING A PARTICLE CONTAMINATION

This application claims priority to German Application No. DE 102018218378.3 filed on Oct. 26, 2018. The entire contents of the above-mentioned German patent application is incorporated herein by reference as part of the disclosure of this U.S. application.

The invention relates to a system for determining a particle contamination. Similarly, the invention relates to a method for determining a particle contamination in a measurement environment.

PRIOR ART

Many, in particular densely populated, regions are subject to significant contamination by suspended particulate matter. This particle contamination is caused at least in part by human beings, specifically primarily by the combustion of carbon compounds by industry, road traffic or else air traffic, shipping and rail traffic and also by private households. Owing to the geographical arrangement of the individual originators of suspended particulate matter, great differences can be observed in the local particle contamination. This is true outdoors just as it is in enclosed spaces.

It is known that suspended particulate matter can lead to damage to health depending on volume and composition, the primary responsibility for this lying with the breathable component of the suspended particulate matter. The individual risk to health is substantially dependent on to what extent and for how long an individual is exposed to what type of particle contamination. There is therefore a need to quantify the local and, in each case, current particle contamination.

The US "National Air Quality" Standard for Particulate Matter (PM) has introduced categorization of suspended particulate matter into $PM_x$ fractions, which takes account of the size or the diameter x of the dust particles and hence of the depth of penetration of these dust particles into the airways and the body of an individual. A distinction is drawn in this case in particular between coarse dust $PM_{10}$, which comprises particles having a diameter of up to 10 µm, fine dust $PM_{2.5}$, having particles with a diameter of up to 2.5 µm, and ultrafine dust $PM_1$, having particles with a diameter of up to 1 µm.

Suspended-particulate-matter or particle contamination is frequently quantified using this PM standard. This involves the dust particle mass per volume that is recorded within a period being indicated for at least one of the fractions $PM_x$. The increasing sensitization towards the problem of particle contamination is generating a demand for opportunities to perform fast, local and autonomous measurement of particle contamination, in particular in larger cities, which suffer particularly greatly from significant contamination by suspended particulate matter. As such, not only national or scientific institutes but also private individuals are interested in finding out the current particle contamination at their present location. There is therefore a need for portable, miniaturized sensors for recording particle contamination.

An exemplary optical particle sensor is known from WO 2017/198699 A1. The particle sensor comprises a laser sensor module having at least two lasers for transmitting appropriate optical measurement laser beams that are reflected by particles in the environment of the particle sensor. The reflected measurement laser beams are detected by means of a common detector, and appropriate measurement signals are output by the detector. The detection principle is based on a Self-Mixing Interference method (SMI method), which must be understood to mean that the reflected measurement beams interfere with the transmitted measurement laser beams. The interference leads to changes in the optical and electrical properties of the laser, said properties being able to be detected and being able to be used to draw conclusions about the properties of the particles in the environment of the particle sensor.

The particle contamination quantification under discussion here is therefore based on recording the number of dust particles within a volume. On the basis of the PM categorization and known models of the size and mass distribution of dust particles, it is therefore possible to ascertain a very good estimate of the particle contamination in the unit "dust particle mass per volume".

This "dust particle mass per volume" information conveys the harmful nature of suspended particulate matter only very inadequately, however, since the dangerous nature of the dust particles is determined not only by the size and weight thereof. These properties merely permit statements about a possible depth of penetration into the body. The toxicity of the dust particles is, additionally, fundamentally determined by their physical and chemical properties, namely by their surface condition and/or chemical composition. Therefore, as prior art known to the applicant internally, characterization information describing the at least one particle source in a respective measurement environment is also taken into consideration as well when ascertaining a particle contamination in a current measurement environment.

DISCLOSURE OF THE INVENTION

The invention provides a system for determining a particle contamination having the features of claim 1 and a method for determining a particle contamination in a measurement environment having the features of claim 12.

Preferred embodiments of the invention are the subject of the respective subclaims.

Advantages of the Invention

The present invention provides opportunities for more accurate and more reliable determination of a particle contamination in a multiplicity of different measurement environments. The opportunities provided by means of the present invention for estimating the (individual) characterization information for the at least one particle source in the respective measurement environment allow more, and more accurate, characterization information to be evaluated for determining the particle contamination in the respective measurement environment. There is a relatively high likelihood of incorrect estimation of the characterization information being precluded when the present invention is used. The present invention therefore allows more reliable determination of the particle contamination in the respective measurement environment, and therefore also helps a person who is present in the respective measurement environment to better adapt his behaviour on the basis of the more precise knowledge of the particle contamination.

One advantageous embodiment of the system for determining a particle contamination is characterized by at least one sensor that captures at least some of the context-related data. The context-related data, on the basis of which the characterization information for the at least one particle source in the measurement environment is estimated, can therefore be measured at least in part by means of the at least one sensor with a high measurement accuracy and a relatively low error rate. The at least one sensor can be in particular an inertial sensor, a pressure sensor, a temperature sensor, a humidity sensor, a gas sensor, a wind sensor, a light sensor, a camera and/or a microphone. Therefore, comparatively inexpensive sensor types are usable as the at least one sensor for the system for determining a particle contamination.

In a further advantageous embodiment, the system for determining a particle contamination has at least one time information transmitter that makes a time of day, day-of-the-week information and/or date information available to the particle source estimation device as at least some of the context-related data. Such time information can also frequently be used to estimate the characterization information for the at least one particle source in the measurement environment more accurately and more reliably.

Similarly, the system for determining a particle contamination can also have at least one interface for externally provided context-related data. In this case, the particle source estimation device can also take into consideration the externally provided context-related data as well when estimating the characterization information for the at least one particle source in the measurement environment. The context-related data evaluable by means of the particle source estimation device are therefore not restricted to context-related data ascertained by components of the system for determining a particle contamination. The at least one interface can be in particular an interface to a locating system and/or to a navigation system for retrieving position data as at least some of the externally provided context-related data and/or an interface to a data provider, in particular for retrieving local weather data, information about local seismic and/or volcanic activities, local traffic information and/or further locally active particle sources as at least some of the externally provided context-related data. Therefore, a multiplicity of context-related data suitable for estimating the characterization information for the at least one particle source are queriable by means of the at least one interface.

In one, likewise very advantageous, embodiment, the system for determining a particle contamination is characterized by at least one user interface for the user-initiated input of at least some of the context-related data. Therefore, a user of the system for determining a particle contamination can also use his input to provide at least some of the context-related data. By way of example, the user can use his input to select at least some of the context-related data from a multiplicity of proposed example data and/or to name said data by means of an appropriate description of the particle source estimation device.

Additionally, the system for determining a particle contamination can also comprise at least one storage medium for the characterization information from at least two different known particle sources, wherein the particle source estimation device has access to the at least one storage medium and is designed to take the available context-related data as a basis for selecting at least one of the known particle sources and making characterization information describing the at least one selected particle source available to the evaluation device for the purpose of ascertaining the output value for the particle contamination. However, it is expressly pointed out at this juncture that the particle source estimation device, as an addition or alternative to the embodiment described here, can also be designed to estimate at least one unknown particle source in the respective measurement environment.

By way of example, the characterization information can comprise information about a size distribution of the particles, about a mass distribution of the particles, about a distribution of a specific material density of the particles, about a material composition of the particles, about at least one surface condition of the particles and/or about at least one optical property of the particles. The information described here permits more reliable and more accurate detection of a toxicity/danger potential of the respective particles. Taking said information into consideration as well when determining the particle contamination in the respective measurement environment therefore helps to stipulate the output value for the particle contamination more accurately and more reliably.

In a further advantageous embodiment of the system for determining a particle contamination, the detector device is an optical particle sensor apparatus. In this case, the detector device comprises an emitting device for transmitting at least one measurement laser beam into the measurement environment and a detection device for detecting a light of the at least one measurement laser beam that is scattered by particles in the measurement environment. Such a detector device is well suited to providing detection signals on the basis of which the at least one estimate of a number of particles per volume in the measurement environment can be reliably stipulated.

Additionally, the detector device can be installed in a mobile device equipped with at least one processor, wherein the functions of the evaluation device and/or of the particle source estimation device are performed at least in part by the at least one processor of the mobile device. A user of this embodiment of the system for determining a particle contamination can therefore carry the detector device with him without difficulty and therefore always use it in his current environment to determine the particular particle contamination present.

As a development, the mobile device can also comprise the at least one sensor for capturing at least some of the context-related data, the at least one time information transmitter, the at least one interface for the externally provided context-related data and/or the at least one user interface for the user-initiated input of at least some of the context-related data. Therefore, the particle source estimation device has access to the thus captured and available context-related data. These context-related data can therefore always be taken into consideration as well when determining the particle contamination in the current environment of the mobile device.

Additionally, the mobile device can comprise the at least one storage medium for characterization information from at least two different known particle sources and/or can have access to at least one external storage medium storing characterization information from at least two different known particle sources. The integration of the system for determining a particle contamination into the mobile device is therefore not an obstacle to use of stored characterization information.

In one advantageous embodiment of the method for determining a particle contamination, at least some of the context-related data are evaluated in order to estimate individual characterization information about the at least one particle source in the current measurement environment. Such a method step can be carried out easily and comparatively quickly.

In a further advantageous embodiment of the method for determining a particle contamination, characterization information is made available for a set of at least two different known particle sources; at least some of the context-related data are evaluated in order to ascertain characteristic quantities describing the current measurement situation, the ascertained characteristic quantities are taken as a basis for identifying at least one particle source from the set of at least two different known particle sources as the most likely particle source for the current measurement situation; and the ascertainment of the output value for the particle contamination is based on the characterization information of the at least one most likely particle source. This embodiment of the method for determining a particle contamination in the respective measurement environment also permits accurate and reliable stipulation of the output value for the particle contamination.

BRIEF DESCRIPTION OF THE DRAWINGS

Further features and advantages of the present invention are explained below on the basis of the figures, in which.

EMBODIMENTS OF THE INVENTION

Figure 1:
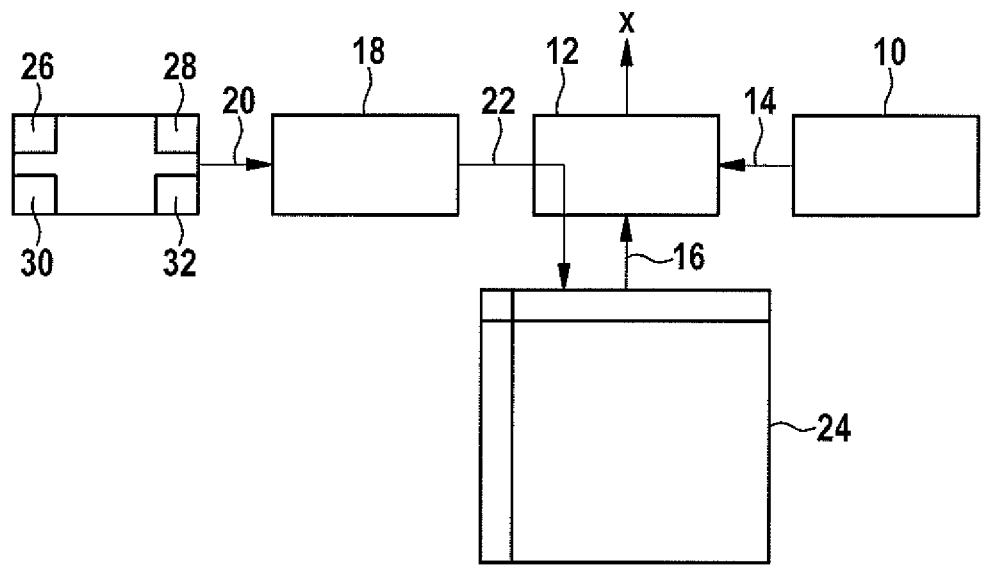
FIG. 1 shows a schematic depiction of an embodiment of the system for determining a particle contamination.

FIG. 1 shows a schematic depiction of an embodiment of the system for determining a particle contamination.

The system for determining a particle contamination that is depicted schematically in FIG. 1 has a detector device 10 for detecting individual particles in a measurement environment of the detector device 10. The detector device 10 can therefore also be referred to as a particle sensor. In particular, the detector device 10 can be an optical particle sensor apparatus. Preferably, the detector device 10 in this case comprises an emitter device (not outlined) for transmitting at least one measurement laser beam into the measurement environment and a detector device (not depicted) for detecting a light of the at least one measurement laser beam that is scattered by particles in the measurement environment. However, it is expressly pointed out that a designability of the detector device 10 is not limited to a specific detector type.

The system for determining a particle contamination also has an evaluation device 12 for detection signals 14 output by the detector device 10. The evaluation device 12 is designed to ascertain at least one estimate of the number of particles per volume in the measurement environment. The at least one estimate can be stipulated in the unit "Dust particle mass per volume", in particular.

Similarly, the evaluation device 12 is designed to ascertain (and output) an output value x for the particle contamination in the measurement environment, wherein the output value x for the particle contamination is based on the at least one estimate of the number of particles per volume and on characterization information 16 describing at least one particle source in the measurement environment. The characterization information 16 describing the at least one particle source in the measurement environment can be understood to mean in particular also information relating to the particles emitted by the at least one particle source present in the measurement environment. The characterization information 16 can be for example information about a size distribution of the particles (emitted by the at least one particle source present in the measurement environment), about a mass distribution of the particles, about a distribution of a specific material density of the particles, about a material composition of the particles, about at least one surface condition of the particles and/or about at least one optical property of the particles. Such information is suitable not only for detecting a possible depth of penetration of the respective particles into the human body, but also for detecting a toxicity/danger potential of the respective particles. Taking into consideration the characterization information 16 as well therefore allows the stipulation of the output value x for the particle contamination to be optimized for an individual risk to health that is actually prevalent for a person in the measurement environment on the basis of the respective particles.

The evaluation device 12 can be in the form, on a processor, of at least one algorithm for estimating the at least one estimate of the number of particles per volume in the measurement environment by taking into consideration the detection signals 14 of the detector device 10 and for stipulating the output value x for the particle contamination in the measurement environment by taking into consideration the at least one estimate and the characterization information 16. The evaluation device 12 is therefore producible inexpensively and with a relatively low installation space requirement.

Additionally, the system for determining a particle contamination also has a particle source estimation device 18 that has access to context-related data 20. The particle source estimation device 18 is designed to take the context-related data 20 as a basis for estimating the characterization information 16 for the at least one particle source in the measurement environment, or for the particles emitted by the at least one particle source present in the measurement environment. The opportunity additionally provided by means of the particle source estimation device 18, in comparison with the prior art, to estimate characterization information 16 for the at least one particle source in the measurement environment on the basis of the context-related data 20 allows the evaluation device 12, as explained in detail below, to have more characterization information 16 and/or more accurate characterization information 16 made available to it for stipulating the output value x. This is a fundamental advantage over taking into consideration firmly prescribed characterization information as well, which is conventionally the only possibility.

By way of example, the system for determining a particle contamination can also advantageously be used, owing to its being equipped with the particle source estimation device 18, in a measurement environment for which the at least one particle source present therein is not previously known, since characterization information 16 for the at least one particle source in the respective measurement environment can be estimated on the basis of the context-related data 20. Even if the system for determining a particle contamination primarily has no information available about the at least one particle source in the respective measurement environment, the particle source estimation device 18 can be used to quickly and reliably estimate the characterization information 16 for the at least one particle source in the respective measurement environment on the basis of the context-related data 20 even for such an "unknown" measurement environment. As explained more precisely below, the system for determining the particle contamination can additionally also react to time- and/or situation-dependent differences in the respective measurement environment by appropriately adapting the characterization information 16 made available to the evaluation device 12. Situation-dependent differences in the respective measurement environment to which the particle source estimation device 18 can react by appropriately adapting the characterization information 16 can be understood to mean in particular weather-dependent and/or traffic-volume-dependent differences. The appropriate adaptation of the characterization information 16 can then also be used to more accurately stipulate the output value x for the particle contamination for such differences. The system for determining a particle contamination can therefore always be used reliably in a multiplicity of measurement environments varying in terms of their local particle contamination.

As depicted schematically in FIG. 1, the particle source estimation device 18 can in particular estimate the at least one particle source in the measurement environment on the basis of the context-related data 20 and output an appropriate output signal 22 for the at least one estimated particle source in the measurement environment to a storage medium 24 storing the specific characterization information 16 of a multiplicity of particle sources for said particle sources. The storage medium 24 then reacts to the output signal 22 output by the particle source estimation device 18 by outputting the relevant characterization information 16. In this manner, the particle source estimation device 18 makes the characterization information 16 available to the evaluation device 12 for the purpose of ascertaining the output value x for the particle contamination. However, it is expressly pointed out that the equipping of the system for determining a particle contamination with the storage medium 24, as portrayed schematically in FIG. 1, must be interpreted only in an exemplary fashion. As becomes clear from the description below, the particle source estimation device 18 can also be designed to take the context-related data 20 as a basis for estimating characterization information 16 for at least one particle source for which the particle source estimation device 18 has no information available previously.

In the embodiment of FIG. 1, the system for determining a particle contamination also has at least one sensor 26 that captures at least some of the context-related data 20. The design of the system with the at least one sensor 26 has the advantage that the at least one sensor 26 can be used to ascertain context-related data 20 for any measurement environment. Additionally, the context-related data 20 capturable by means of the at least one sensor 26 can always be remeasured for the respective measurement environment. The system for determining a particle contamination can therefore also use the at least one sensor 26 to react to changes in the respective measurement environment that affect its at least one particle source by reestimating the characterization information 16 output to the evaluation device 12.

The at least one sensor 26 can be an inertial sensor (motion sensor) for example. In this case, the inertial sensor can be used to ascertain whether the inertial sensor is present motionlessly or is being moved at a specific velocity, or with a specific acceleration. The motion data ascertainable by means of the inertial sensor permit conclusions about a type of motion of the inertial sensor, such as for example a motion of the inertial sensor at walking velocity, running velocity, cycling velocity, vehicle velocity and/or train velocity. Accordingly, the detected type of motion of the inertial sensor can be used to infer the current measurement environment. This permits reliable estimation of the at least one particle source present in the current measurement environment by the particle source estimation device 18.

Similarly, the at least one sensor 26 can also be a pressure sensor. The pressure values measured by the pressure sensor can be used to infer an altitude of the current measurement environment. Such "geolocation" also permits reliable estimation of the characterization information 16 for the at least one particle source in the current measurement environment by means of the particle source estimation device 18.

Alternatively or additionally, the at least one sensor 26 can also be a temperature sensor. Temperature values, or fluctuations thereof, that are output by means of the temperature sensor can be used to infer a local climate, a current time of day (such as e.g. morning, noon, evening or night), a current season (e.g. summer time or winter time, rainy season or dry season) and/or any presence of a heat source in the measurement environment, for example a fire, a switched-on stove and/or an operated internal combustion engine. Such climate, time and/or environment information can easily be evaluated by means of the particle source estimation device 18 to stipulate the characterization information 16 to be output to the evaluation device 12.

Accordingly, the at least one sensor 26 can also be a humidity sensor (e.g. an air-humidity sensor). The measured values output by a humidity sensor also permit conclusions about a climate/weather prevalent in the current measurement environment. Similarly, specific environments can be detected on the basis of the air humidity that is more often than not present therein. Whereas for example a relatively high air humidity is more often than not present in swimming baths, the air in offices is comparatively dry as a rule.

If the at least one sensor 26 is a gas sensor, chemical properties of the air present in the current measurement environment can also be detected as context-related data 20 and evaluated by means of the particle source estimation device 18. A wind sensor can also be used to draw conclusions about the climate/weather prevalent in the current measurement environment. A wind direction, determined by means of the wind sensor, of a wind prevalent in the current measurement environment can additionally advantageously be evaluated using information relating to a distribution of particle sources, in order to determine the likelihood with which particles from a specific particle source are blown into the measurement environment.

In a further advantageous embodiment, the system for determining a particle contamination also has a light sensor as its at least one sensor 26. A light sensor can be understood to mean either a brightness sensor or a spectrometer. Brightness values determined by the brightness sensor permit conclusions to be drawn about a time of day and/or a weather (e.g. sun or rain) prevalent in the current measurement environment. A light spectrum measured by means of the spectrometer allows a distinction to be drawn between open environments having a comparatively high intensity of low-wavelength radiation by day and closed environments (e.g. inside a house or a vehicle), in which low-wavelength radiation is "filtered out" by means of at least one glass window as a rule even by day.

As an advantageous embodiment, the at least one sensor 26 can also be a camera. Image data delivered by the camera often allow graphical detection of at least one particle source, such as for example a burning cigarette, a switched-on stove, a (steaming) cooking vessel, a fire, a grill, an active internal combustion engine, a vehicle and/or a chimney. In particular, a quantity of the particles released by the respective particle source can frequently be estimated by means of an image evaluation of the image data delivered by the camera. The image data delivered by the camera as context-related data 20 therefore permit reliable estimation of the characterization information 16 by means of the particle source estimation device 18.

In addition, the at least one sensor 26 can also be a microphone. Many particle sources, such as for example a travelling vehicle, an operated internal combustion engine, an operated industrial installation, a switched-on vacuum cleaner and/or a burning fire, produce typical sounds that are identifiable on the basis of an evaluation of the sound data picked up by the microphone. Similarly, a multiplicity of different environments can be identified on the basis of the sounds typically occurring therein. By way of example, an inside of a living room can be reliably identified as the current measurement environment on the basis of television sounds, a wood or a park can be reliably identified as the current measurement environment on the basis of birdsong, an inside of a kitchen can be reliably identified as the current measurement environment on the basis of kitchen wear rattling and/or cooking sounds, roads can be reliably identified as the current measurement environment on the basis of vehicle sounds and public places can be reliably identified as the current measurement environment on the basis of numerous stamping sounds and/or voices. Such information can also be evaluated by the particle source estimation device 18 in order to estimate the characterization information 16 for the at least one particle source in the measurement environment.

In summary, it can thus be stated that the at least one sensor 26 of the system for determining a particle contamination often allows estimation/identification of a time, of a weather/climate, "geolocation" of the current measurement environment, physical properties of the current measurement environment, chemical properties of the current measurement environment, of at least one action performed in the current measurement environment, of the at least one particle source present in the current measurement environment and/or of a type of the current measurement environment (e.g. urban environment or rural environment, natural environment or industrial environment, coast or interior). All this allows conclusions to be drawn about the characterization information 16 for the at least one particle source in the measurement environment.

As an alternative or in addition to the at least one sensor 26, the system for determining a particle contamination can also comprise at least one time information transmitter 28 that makes a time of day, day-of-the-week information and/or date information available to the particle source estimation device 18 as at least some of the context-related data 20. Instead of deducing the time of day, the day-of-the-week information (such as e.g. work day or weekend) and/or the date information (e.g. spring, summer, autumn or winter) from the measured values measured by the at least one sensor 26, this information can also be provided to the particle source estimation device 18 directly by means of the at least one time information transmitter 28. The time data delivered by the at least one time information transmitter 28 can then be evaluated for example using the measured values measured by the at least one sensor 26.

Advantageously, the system for determining a particle contamination can also have at least one interface 30 for externally provided context-related data. The at least one interface 30 can be for example an interface to a locating system and/or to a navigation system for retrieving position data as at least some of the externally provided context-related data. Examples of a locating system and/or navigation system suitable for providing at least some of the externally provided context-related data are a GPS system (Global Positioning System), a satellite navigation system, e.g. the GLONASS system (global navigation satellite system of the Ministry Of Defence of the Russian Federation), the Galileo system or a BeiDou system (Chinese satellite navigation system, such as BeiDou-2), a mobile phone mast locating system (Cell Tower ID), a triangulation locating system and/or a wireless access point system. Similarly, the at least one interface 30 can also be an interface to a data provider (i.e. a provider of externally provided context-related data). Such a data provider can be used in particular for retrieving local weather data, information about local seismic and/or volcanic activities, local traffic information and/or further locally active particle sources as at least some of the externally provided context-related data. Therefore, a multiplicity of context-related data 20 can also be queried externally and subsequently evaluated by the particle source estimation device 18 to estimate the characterization information 16 for the at least one particle source in the current measurement environment.

The at least one sensor 26, the at least one time information transmitter 28 and/or the at least one interface 30 can therefore be used to capture and/or query a multiplicity of context-related data 20 that are well suited to estimating the characterization information 16. As an alternative or in addition to the components 26 to 30, the system for determining a particle contamination can also have at least one user interface 32 for the user-initiated input of at least some of the context-related data. A user of the system for determining a particle contamination can therefore also provide at least some of the context-related data 20 to the particle source estimation device 18 himself, for example by means of a selection from a table and/or an entered description.

As portrayed graphically in FIG. 1, arrangement of the components 26 to 32 directly on the particle source estimation device 18 is not necessary. Instead, the components 26 to 32 can also be arranged on at least one device that is at a distance from the particle source estimation device 18. In this case, at least some of the context-related data 20 can be provided to the particle source estimation device 18 by means of a wireless connection.

Preferably, the detector device 10 of the system for determining a particle contamination is installed in a mobile device. The mobile device can be understood to mean for example a smartphone, a mobile phone, a tablet or an iPad. Advantageously, the mobile device is equipped with at least one processor, which means that the functions of the evaluation device 10 and/or of the particle source estimation device 18 can be performed at least in part by the at least one processor of the mobile device. The at least one sensor 26 for capturing at least some of the context-related data 20, the at least one time information transmitter 28, the at least one interface 30 for the externally provided context-related data 20 and/or the at least one user interface 32 for the user-initiated input of at least some of the context-related data 20 can also be installed on and/or in the mobile device. This ensures that the particle source estimation device 18, or the at least one processor performing the functions of the particle source estimation device 18, has access to the thus captured and available context-related data 20. Additionally, a mobile device frequently already has at least one of the components 26 to 32. As already explained above, integration of the components 26 to 32 into the mobile device can frequently also be dispensed with, however.

The mobile device can also have the storage medium 24 described above. Similarly, however, the mobile device can also have access to at least one external storage medium storing characterization information from at least two different known particle sources. Integration of the storage medium 24 into the mobile device is therefore optional.

Figure 2:
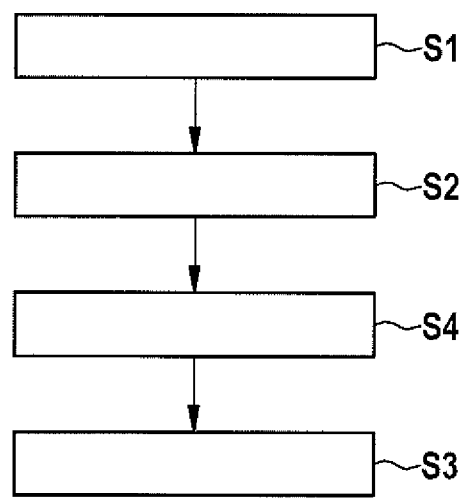
FIG. 2 shows a flowchart to explain an embodiment of the method for determining a particle contamination in a measurement environment.

FIG. 2 shows a flowchart to explain one embodiment of the method for determining a particle contamination in a measurement environment.

When the method for determining a particle contamination in a measurement environment is carried out, a method step S1 involves individual particles in the measurement environment being detected. The detection of the particles in the measurement environment can be effected optically, for example. In particular, the measurement environment can be probed by means of at least one measurement laser beam, a light of the at least one measurement laser beam that is scattered by particles in the measurement environment being detected at the same time. The ability of method step S1 to be carried out does not presuppose a specific measurement method, however.

A method step S2 then involves at least one estimate of the number of particles per volume in the measurement environment being ascertained, to which end at least one measured value obtained by method step S1 is evaluated. On the basis of the at least one estimate of the number of particles per volume, an output value for the particle contamination in the measurement environment is subsequently ascertained as method step S3. The ascertaining of the output value for the particle contamination in the measurement environment is also effected on the basis of characterization information describing at least one particle source in the measurement environment. Examples of the characterization information are already listed above.

Before method step S3, a method step S4 is also carried out, in which context-related data are made available and the characterization information is estimated on the basis of the available context-related data. Method step S4 therefore gets around the conventional restriction of the characterization information evaluable in method step S3 to firmly prescribed information and instead allows flexible adaptation of the characterization information to be evaluated to the context-related data.

By way of example, at least some of the context-related data are evaluated in order to estimate individual characterization information about the at least one particle source in the current measurement environment. In one possible embodiment of method step S4, at least some of the context-related data can be evaluated in order to ascertain characteristic quantities describing the current measurement situation (of method step S1). Thereafter, by using characterization information made available for a set of at least two different known particle sources, at least one particle source from the set (of at least two different known particle sources) can be identified as the most likely particle source for the current measurement situation on the basis of the ascertained characterization quantities. This allows the output value for the particle contamination to be ascertained by taking into consideration the characterization information of the at least one most likely particle source as well.

The method described here for determining a particle contamination in a measurement environment also brings about the advantages explained above. These advantages are not listed again at this juncture, however.

The invention claimed is:

1. A system for determining a particle contamination, comprising:
   a detector device for detecting individual particles in a measurement environment of the detector device and generating detection signals in response thereto;
   an evaluation device for detection signals of the detector device, which is configured and operable
   to ascertain at least one estimate of the number of particles per volume in the measurement environment, and
   to ascertain an output value for the particle contamination in the measurement environment, wherein the output value for the particle contamination is based on the at least one estimate of the number of particles per volume and on characterization information describing at least one particle source in the measurement environment; and
   a particle source estimation device that is configured and operable to
   access to context-related data, and
   use the context-related data as a basis for estimating the characterization information for the at least one particle source in the measurement environment and making said characterization information available to the evaluation device for ascertaining the output value for the particle contamination.

2. The system for determining a particle contamination according to claim 1, characterized by at least one sensor that captures at least some of the context-related data.

3. The system for determining a particle contamination according to claim 2, wherein the at least one sensor is at least one of an inertial sensor, a pressure sensor, a temperature sensor, a humidity sensor, a gas sensor, a wind sensor, a light sensor, a camera and a microphone.

4. The system for determining a particle contamination according to claim 1, further comprising at least one time information transmitter that makes a time of day, day-of-the-week information and/or date information available to the particle source estimation device as at least some of the context-related data.

5. The system for determining a particle contamination according to claim 1, further comprising at least one interface for externally provided context-related data, wherein the at least one interface is one or more of
   an interface to a locating system and/or to a navigation system for retrieving position data as at least some of the externally provided context-related data, and
   an interface to a data provider, in particular for retrieving local weather data, information about local seismic and/or volcanic activities, local traffic information and/or further locally active particle sources as at least some of the externally provided context-related data.

6. The system for determining a particle contamination according to claim 1, further comprising at least one user interface for the user-initiated input of at least some of the context-related data.

7. The system for determining a particle contamination according to claim 1, further comprising at least one storage medium for the characterization information from at least two different known particle sources, wherein the particle source estimation device is configured to access to the at least one storage medium and is configured to take the available context-related data as a basis for selecting at least one of the known particle sources and making characterization information describing the at least one selected particle source available to the evaluation device for the purpose of ascertaining the output value for the particle contamination.

8. The system for determining a particle contamination according to claim 1, characterized in that the characterization information comprises information about one or more of a size distribution of the particles, a mass distribution of the particles, a distribution of a specific material density of the particles, a material composition of the particles, at least one surface condition of the particles and at least one optical property of the particles.

9. The system for determining a particle contamination according to claim 1, characterized in that the detector device is an optical particle sensor apparatus comprising an emitting device for transmitting at least one measurement laser beam into the measurement environment and a detection device for detecting a light of the at least one measurement laser beam that is scattered by particles in the measurement environment.

10. The system for determining a particle contamination according to claim 1, characterized in that the detector device is installed in a mobile device equipped with at least one processor, wherein the functions of the evaluation device and/or of the particle source estimation device are performed at least in part by the at least one processor of the mobile device.

11. The system for determining a particle contamination according to claim 10, characterized in that the mobile device comprises one or more of:
   the at least one sensor for capturing at least some of the context-related data;
   the at least one time information transmitter;
   the at least one interface for the externally provided context-related data; and
   the at least one user interface for the user-initiated input of at least some of the context-related data;
   wherein the particle source estimation device has access to the thus captured and available context-related data.

12. The system for determining a particle contamination according to claim 10, characterized in that the mobile device comprises the at least one storage medium for characterization information from at least two different known particle sources and/or is configured to access to at least one external storage medium storing characterization information from at least two different known particle sources.

13. A method for determining a particle contamination in a measurement environment, comprising
   detecting individual particles in the measurement environment;
   ascertaining at least one estimate of the number of particles per volume in the measurement environment; and
   using the at least one estimate of the number of particles per volume and characterization information describing at least one particle source in the measurement environment as a basis for ascertaining an output value for the particle contamination in the measurement environment;
   wherein context-related data are made available and the characterization information is estimated on the basis of the available context-related data.

14. The method for determining a particle contamination according to claim 13, characterized in that at least some of the context-related data are evaluated in order to estimate individual pieces of characterization information about the at least one particle source in the current measurement environment.

15. The method for determining a particle contamination according to claim 13, characterized in that
   characterization information is made available for a set of at least two different known particle sources;
   at least some of the context-related data are evaluated in order to ascertain characteristic quantities describing the current measurement situation,
   the ascertained characteristic quantities are taken as a basis for identifying at least one particle source from the set of at least two different known particle sources as the most likely particle source for the current measurement situation; and
   the ascertainment of the output value for the particle contamination is based on the characterization information of the at least one most likely particle source.

* * * * *